3,285,958
PREPARATION OF TRIAMINOGUANIDINE COMPOUNDS FROM DICYANDIAMIDE

Daniel R. Satriana, Verona, N.J., assignor to the United States of America as represented by the Secretary of the Army
No Drawing. Filed Dec. 1, 1964, Ser. No. 415,572
6 Claims. (Cl. 260—564)

The invention described herein may be manufactured and used by or for the Government for governmental purposes without the payment to me of any royalty thereon.

This invention relates to triaminoguanidine (hereinafter referred to as TAG) and salts thereof and more particularly concerns unique and improved processes for their preparation.

In the past, TAG had been prepared by Stolle and Krauch by reacting dicyandiamide (hereinafter referred to as DCDA) and hydrazine hydrate at 40° C. for about 8 hours. The low yield product isolated was identified as the tribenzylidene hydrochloride derivative and data concerned therewith are shown in the table, Experiment No. 1. When the reaction temperature was raised to 110° C. (Exp. No. 2) and the reaction time decreased to about 5½ hours, other conditions remaining generally the same, no triaminoguanidine nitrate (hereinafter referred to as TAGN) was formed.

TAGN may be prepared by the aqueous fusion of calcium cyanamide and hydrazine nitrate. If DCDA disproportionates into cyanamide in accordance with the reaction

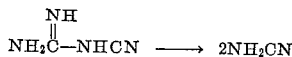

it would appear likely that hydrazine nitrate would react and form TAGN as in the aqueous fusion of calcium cyanamide. When DCDA was used under similar conditions as the calcium cyanamide fusion method, no TAGN was formed as shown in the table, Experiment No. 3.

Since TAG compounds are finding widespread application in vital rocket and artillery components as well as in explosives, des-oxidants, organic intermediates, etc., it would be advantageous if improved processes for their preparation could be developed.

It is therefore a broad object of this invention to provide processes for preparing TAG compounds.

Another object of the invention is to provide high purity, good yield TAG compounds which involve improved processes.

Other and further objects of the invention will be apparent to those skilled in the art upon study of this disclosure.

It is known that TAG free base decomposes rapidly in moist air or in an aqueous medium. Hence, it is necessary to make the salt of the free base more stable during the reaction in order to decrease its tendency toward decomposition which can readily be accomplished by reacting a mixture of hydrazine nitrate and hydrazine hydrate with DCDA. A 54% yield of TAGN was obtained and the data are shown in Table I, Experiment No. 4. As a result thereof the hydrazine nitrate was increased in amount from 10% to 200% while the hydrazine hydrate was maintained constant. The stoichiometric relationship of DCDA to hydrazine adduct was taken as 1 to 6 in accordance with the following equation:

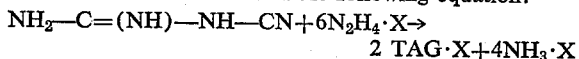

where X is the acid component.

The stoichiometric amount of hydrazine nitrate was based on a 1:6 molar ratio of DCDA to hydrazine nitrate to yield the required amount of TAGN. Similarly, concentrations in excess of this ratio were used. These reactions were carried out at 80–90° C. for about 3½ hours. The results are tabulated in Experiments No. 5 through 9 inclusive. Yields were based on 1:1 molar ratios of DCDA to TAGN since it became evident that under the conditions of the reaction, disproportionation of DCDA did not yield two moles of cyanamide as predicted. Except for Experiment No. 5, the yield of TAGN was fairly constant and did not depend on a large excess of hydrazine nitrate as in the aqueous fusion of calcium cyanamide method or hydrazine nitrate method.

As a result of these experiments, the amount of hydrazine nitrate was reduced to equimolar proportions to DCDA. Only a 25% excess of hydrazine nitrate was used to insure complete conversion of the free base to the nitrate salt. A yield of 87.7% TAGN was now obtained and the results are listed in Table I, Experiment No. 10.

In order to determine the concentration of hydrazine hydrate for optimum yields of TAGN, the molar ratio of DCDA to hydrazine hydrate was reduced as shown in Experiments No. 11 and 12. These results indicate that at least a 1:3 molar ratio of DCDA to hydrazine hydrate was needed for optimum yields of TAGN.

Again, in determining the effect of temperature upon the yield of TAGN, Stolle's 40° C. reaction temperature condition was performed and then compared to my experiment carried out at 80–90° C. (Experiments No. 13 and No. 6, Table I). The yield at the lower temperature was only 60% compared to 79% at the higher temperature. Stolle claims that at a higher temperature (60–70° C.) and a large excess of hydrazine hydrate (1 mole of DCDA to 2.5 moles of hydrazine hydrate), the best yield of guanazole is obtained. In my modified procedure, the best yield of TAGN was obtained at 80–90° C. with a 1:4.25 molar ratio of DCDA to hydrazine adduct. Upon increasing the reaction temperature from 80–90° C. to 110–115° C. there was no change in yield of TAGN as shown in Table I, Experiments No. 4 and 5.

The effect of reaction time was also determined under one set of conditions as shown in Experiments No. 9 and 14. In one hour, a 73% yield of TAGN was obtained as compared to a 78% yield for a reaction time of 3½ hours.

EXAMPLE NO. I

A typical procedure for the preparation of TAGN from DCDA is given below:

Chemicals 16.8 g. (0.2 mole) DCDA
23.75 g. (0.25 mole) hydrazine nitrate (25% excess)
35.3 g. (0.6 mole) hydrazine hydrate (85% solution)

Procedure

In a 200 ml. 3-necked, round bottom flask, fitted with a mechanical stirrer, the DCDA is added to the solution of hydrazine nitrate in hydrazine hydrate. The mixture is heated at 85–90° C. by means of an oil bath for about 3.5 hours. 110 ml. of water is then added. The mixture is heated until the solid dissolves. The solution is quickly transferred to beaker and chilled in an ice bath. The product is filtered, washed with cold water and dried in the oven at about 100° C. or in a vacuum desiccator over sulfuric acid. The yield of material is 87.7% (M.P. 215–216° C.). The minimum molar ratios of DCDA to hydrazine nitrate, and hydrazine hydrate are of the order of 1 to 1.25 to 3 respectively.

EXAMPLE NO. 2.—PREPARATION OF TRIAMINO-GUANIDINE NITRATE

*Chemicals*

16.8 g. (0.2 mole) DCDA
23.75 g. (0.25 mole) hydrazine nitrate (25% excess)
47.1 g. (0.8 mole) hydrazine hydrate (85% solution)

*Procedure*

The DCDA is added to a vigorously stirred solution of the hydrazine nitrate in hydrazine hydrate. The mixture is heated for 3.5 hours at 85–90° C. followed by the addition of 110 ml. of water. The mixture is heated to dissolve the solid material and the solution is quickly transferred to a beaker and chilled in an ice bath. The TAGN is filtered, washed with ice cold water and dried at 100° C. The yield of product is 87.7%.

EXAMPLE NO. 3.—PREPARATION OF TRIAMINO-GUANIDINE HYDROCHLORIDE FROM DCDA

*Chemicals*

16.8 g. (0.2 mole) DCDA
34.2 g. (0.5 mole) hydrazine hydrochloride (25% excess)
47.0 g. (0.8 mole) hydrazine hydrate (85% solution)

*Procedure*

The above mixture is heated at 80–90° C. with stirring for 1.5 hours. 100 ml. of water is added and the mixture is heated to effect solution. The solution is then quickly poured into a beaker and chilled. The product is filtered, washed with ice cold water, and dried at 100° C. The yield of TAG·HCl is 89% (M.P. 240° C. uncorrected).

EXAMPLE NO. 4.—PREPARATION OF TRIS-(METHYLAMINO) GUANIDINE NITRATE
$(CH_3NHNH)_2$—$C$=$NNHCH_3 \cdot HNO_3$

*Chemicals*

16.8 g. (0.2 mole) DCDA
27.3 g. (.25 mole) monomethyl hydrazine nitrate
27.0 g. (.6 mole) monomethyl hydrazine

*Procedure*

The above mixture is heated at 85–90° C. with stirring for 3.5 hours. 110 ml. of water is then added and the mixture heated to dissolve the solid. The solution is quickly poured into a beaker and chilled. The product is filtered, washed with cold water, and dried either in the oven at 100° C. or in a vacuum desiccator over sulfuric acid.

EXAMPLE NO. 5.—PREPARATION OF TRIS(DIMETHYLAMINO) GUANIDINE NITRATE
$[(CH_3)_2NNH]$—$C$=$NN(CH_3)_2 \cdot HNO_3$

*Chemicals*

16.8 g. (0.2 mole) DCDA
30.8 g. (0.25 mole) unsymmetrical dimethyl hydrazine nitrate
36.0 g. (0.60 mole) unsymmetrical dimethyl hydrazine

*Procedure*

The above chemicals are heated at 85–90° C. with stirring for 3.5 hours. 110 ml. of water is added and the mixture heated once more to effect solution. The solution is then quickly transferred to a beaker and chilled.

The product is filtered, washed with cold water, and dried by standard procedure.

EXAMPLE NO. 6.—PREPARATION OF TRIS-(PHENYLAMINO) GUANIDINE NITRATE
$(C_6H_5NHNH)_2C$=$NNHC_6H_5 \cdot HNO_3$

*Chemicals*

16.8 g. (0.2 mole) DCDA
42.8 g. (0.25 mole) phenyl hydrazine nitrate
64.8 g. (0.6 mole) phenyl hydrazine

*Procedure*

The procedure is the same as in Example No. 5.

TABLE I

| Experiment No. | Dicyandiamide (Moles) | Hydrazine Nitrate (Moles) | Excess Hydrazine Nitrate (Percent) | Hydrazine Hydrate (Moles) | Reaction Time (Hours) | Reaction Temperature (° C.) | Yield of TAGN (Percent) | Remarks |
|---|---|---|---|---|---|---|---|---|
| 1 | 0.238 | | | 0.60 | 8.0 | 40 | 6.6 | Reaction Conditions Reported by Stolle. |
| 2 | 0.20 | | | [1] 0.60+ | 5.5 | 110 | Nil | Higher Temperature than Exp. No. 1. |
| 3 | 0.10 | 1.9 | 225.0 | | 2.0 | 130–135 | Nil | Same Conditions as $CaCN_2$ Fusion Method. |
| 4 | 0.20 | 0.44 | 10.0 | 0.88+ | 2.0 | 110–115 | 54.0 | Compare with Exp. No. 5 for Temp. Effect. |
| 5 | 0.10 | 0.22 | 10.0 | 0.40 | 2.0 | 85–90 | 54.0 | Effect of Hydrazine Nitrate. |
| 6 | 0.10 | 0.25 | 25.0 | 0.40 | 3.5 | 80–90 | 79.0 | Do. |
| 7 | 0.10 | 0.30 | 50.0 | 0.40 | 3.5 | 80–90 | 78.4 | Do. |
| 8 | 0.10 | 0.40 | 100.0 | 0.40 | 3.5 | 80–90 | 76.0 | Do. |
| 9 | 0.10 | 0.60 | 200.0 | 0.40 | 3.5 | 80–90 | 78.0 | Do. |
| 10 | 0.20 | 0.25 | 25.0 | 0.80 | 3.5 | 80–90 | 87.7 | Molar ratio of DCDA to hydrazine nitrate to hydrazine hydrate 1:1.25:4. |
| 11 | 0.20 | 0.25 | 25.0 | 0.60 | 3.5 | 85–90 | 87.7 | Molar ratio 1:1.25:3. |
| 12 | 0.20 | 0.25 | 25.0 | 0.40 | 3.5 | 85–90 | 70.5 | Molar ratio 1:1.25:2. |
| 13 | 0.10 | 0.25 | 25.0 | 0.40 | 8.0 | 40 | 60.0 | Effect of Temperature (compare with Exp. No. 6). |
| 14 | 0.10 | 0.60 | 200.0 | 0.40 | 1.0 | 85–90 | 73.0 | Effect of Reaction Time (compare with Exp. No. 9). |

[1] 10% Excess.

The success of my processes resides principally in the inclusion of hydrazine nitrate in the aforementioned reactions to produce excellent yields characterized by high purity. Hydrazine nitrate provides the reaction with the hydrazine adduct and more importantly, prevents the decomposition of the TAG base by forming the more stable nitrate salt.

My process can be used to prepare other TAG components by the use of hydrazine sulfate, chloride, perchlorate, hydrazoate, toluenesulfonate, oxalate and other organic acids.

It is also possible to substitute other hydrazinium components such as monoalkyl and unsymmetrical dialkyl hydrazines as well as their counterparts. More specifically, monomethyl hydrazine, unsymmetrical dimethyl hydrazine, phenyl hydrazine and methyl phenyl hydrazine have been found to work admirably well.

My process is also more economical than the calcium cyanamide fusion method as shown by the following data:

| Materials Used | Calcium Cyanamide Method | Dicyandiamide Method |
|---|---|---|
| Calcium Cyanamide (lbs.) | 1.0 | |
| Dicyandiamide (lbs.) | | 1.0 |
| Hydrazine Hydrate (lbs.) | 4.22 | 2.53 |
| Nitric Acid (lbs.) | 5.32 | 0.93 |
| Ammonium Carbonate (lbs.) | 1.16 | None |
| Yield of Triaminoguanidine Nitrate (lbs.) | 1.88 | 1.79 |

I claim:

1. A process for preparing triaminoguanidine compounds by reacting dicyandiamide with a compound selected from the group consisting of hydrazine nitrate and hydrazine hydrate; hydrazine hydrochloride and hydrazine hydrate; monomethyl hydrazine nitrate and monomethyl hydrazine; unsymmetrical dimethyl hydrazine nitrate and unsymmetrical dimethyl hydrazine; and phenyl hydrazine nitrate and phenyl hydrazine.

2. A process for preparing triaminoguanidine nitrate compounds by reacting 16.8 g. dicyandiamide, 23.75 g. hydrazine nitrate and an 85% solution of 35.3 to 47.1 g. hydrazine hydrate, heating the reactants to 85–90° C. for almost 3½ hours, adding about 110 ml. of water to the heated reactants, further heating the diluted reactants until solid dissolves to form a solution, chilling the solution and filtering, washing and drying the triaminoguanidine nitrate.

3. A process for preparing triaminoguanidine hydrochloride by reacting 16.8 g. dicyandiamide, 34.2 g. hydrazine hydrochloride and an 85% solution of 47.0 g. hydrazine hydrate, heating the reactants to 80–90° C. for 1½ hours, adding about 100 ml. of water to the heated reactants, heating the diluted reactants to form a solution, chilling the solution and filtering, washing and drying the triaminoguanidine hydrochloride.

4. A process for preparing tris(methylamino) guanidine nitrate by reacting 16.8 g. dicyandiamide, 27.3 g. monomethyl hydrazine nitrate and 27.0 monomethyl hydrazine, heating the reactants to 85–90° C. for 3½ hours, adding 110 ml. of water to the heated reactants, heating the diluted reactants to form a solution, chilling the solution and filtering, washing and drying the tris(methylamino) guanidine nitrate.

5. A process for preparing tris(dimethylamino) guanidine nitrate by reacting 16.8 g. dicyandiamide, 30.8 g. unsymmetrical dimethyl hydrazine nitrate and 36.0 g. unsymmetrical dimethyl hydrazine, heating the reactants to 85–90° C. for 3½ hours, adding 110 ml. of water to the heated reactants, heating the diluted reactants to form a solution, chilling the solution and filtering, washing and drying the tris(dimethylamino) guanidine nitrate.

6. A process for preparing tris(phenylamino) guanidine nitrate by reacting 16.8 g. dicyandiamide, 42.8 g. phenyl hydrazine nitrate and 64.8 g. phenyl hydrazine, heating the reactants to 80–90° C. for 1½ hours, adding about 100 ml. of water to the heated reactants, heating the diluted reactants to form a solution, filtering, washing and drying the tris(phenylamino) guanidine nitrate.

References Cited by the Examiner
UNITED STATES PATENTS
2,945,061   7/1960   Habernickel _____ 260—551

CHARLES B. PARKER, *Primary Examiner.*

LEON D. ROSDOL, REUBEN EPSTEIN, *Examiners.*

L. A. SEBASTIAN, *Assistant Examiner.*